United States Patent [19]
Chung

[11] 3,823,833
[45] July 16, 1974

[54] POLYUREAURETHANE SHOCK ABSORBING UNIT

[75] Inventor: Daniel A. Chung, North Canton, Ohio

[73] Assignee: The Goodyear Tire & Rubber Company, Akron, Ohio

[22] Filed: Aug. 8, 1973

[21] Appl. No.: 386,688

[52] U.S. Cl.......... 213/40 R, 260/2.5 BD, 267/63 R
[51] Int. Cl............................................. B61g 9/10
[58] Field of Search.............. 213/40 R, 40 D, 44; 267/63 R; 260/2.5 BD, 2.5 A

[56] References Cited
UNITED STATES PATENTS
3,370,718  2/1968  Waddell....................... 213/40 R X
3,741,406  6/1973  Anderson..................... 213/40 R X Primary Examiner—Lloyd L. King
Assistant Examiner—Michael Y. Mar
Attorney, Agent, or Firm—F. W. Brunner; H. C. Young, Jr.

[57] ABSTRACT

A polyureaurethane shock absorbing unit prepared from an adjusted and balanced mixture of specific diamines, di-isocyanates and a manipulative determined molecular weight balance of predetermined polyether polyols and polyester polyols. The unique shock absorbing unit is characterized by withstanding at least 300 cycles of a cyclic shock endurance test when of the prescribed configuration.

12 Claims, 3 Drawing Figures

PATENTED JUL 16 1974  3,823,833

POLYUREAURETHANE SHOCK ABSORBING UNIT

This invention relates to shock absorbing units having an extended dynamic shock absorbing ability. The invention more particularly relates to shock absorbing elements for railroad car draft gears of resilient cured polyureaurethane compositions which can withstand dynamic compressive cycling under constant compression and to a method of their preparation.

Railroad draft gear shock absorbing units have undergone an evolutionary state of development. Because of the extremely large and repetitive shocks which the relatively small absorbing units must be able to dynamically withstand, a combination of dynamic compressive test and shock absorbing element composition have had to be coordinated. A simple substitution of materials is ineffective. As dynamic compressive endurance evaluation procedures and requirements have become more exacting, the shock absorbing element composition is required to become more sophisticated.

Of particular importance is the demanding requirements of a dynamic compressive cycling test as a measure for determining suitable units for railroad draft gear service. This test requirement is in addition to typical deflection, low temperature and drop hammer tests. The compressive cycling test can be exemplified by obtaining a resilient shock absorbing element comprising a resilient composition of a short cylindrical shape measuring about 6.5 inches diameter and about 1.5 inches high with its sides in the shape of a concave V and with its ends covered and adhered to the face of circular steel plates and cycling said element under constant compression alternating between a maximum of about 45 to about 55 percent of its original uncompressed polyureaurethane element height and a minimum of about 8 to about 12 percent of its said original height. The polyureaurethane element itself constantly undergoes a very substantial change in shape as it is compressed and decompressed during such dynamic cycle. Under this relatively severe test, a typical unit can break down or crack within about 50 to about 100 cycles. However, a suitable unit for railroad draft gear service should last or withstand at least about 300 cycles and preferably at least about 500 cycles.

This severe dynamic endurance requirement necessitates a new and greater sophistication for a shock absorbing element composition for railroad draft gear use.

Therefore, in view of these substantial and demanding shock absorbing compressive endurance requirements, it is an object of this invention to provide an improved resilient shock absorbing unit.

In accordance with this invention, it has been discovered that an improved shock absorbing unit comprises a shaped resilient polyureaurethane composition characterized by withstanding compressive cycling for at least about 300 cycles, preferably at least about 500 cycles, under constant compression alternating between a maximum of about 45 to about 55 percent and a minimum of about 8 to about 12 percent of its original uncompressed height and further characterized by deflecting from about 0.3 to about 0.6 inch, preferably from about 0.4 to about 0.5 inch, at about 25°C. upon the application of about 1,800 pounds per square inch uniformly to the end surface areas of the said resilient compositions when the said composition is a generally disc-shaped cylindrical element with circular parallel end surfaces, said surfaces covered and adhered to circular steel plates, having a diameter of about 1.5 inches and a sidewall connecting the end surfaces substantially in the form of a V-shaped groove having substantially equal length sides, the said groove extending between the said end surfaces, the volume of the solid portion of said element being about 150 percent of the volume of the said groove, where said resilient shock absorbing polyureaurethane composition is prepared by the method which comprises reacting at least one diamine selected from 2,2'-diaminodiphenyl disulfide, 4,4'-diaminodiphenydisulfide, orthodichlorobenzidine and 4,4'-methylene-bis-orthochloro-aniline with the reaction product of (A) at least one di-isocyanate selected from 3,3'-bitolylene-4,4'-diisocyanate and 3,3'-dimethyldiphenylenemethane-4,4'-diisocyanate, when said diamine is selected from 2,2'-diaminodiphenyldisulfide and 4,4'-diaminodiphenyldisulfide and from 3,3'-dimethyldi-phenylenemethane-4,4'-diisocyanate when said diamine is selected from orthodichlorobenzidine and 4,4'-methylene-bis-orthochloroaniline, with (B) a mixture of at least one polymeric polyol with a total average molecular weight of about 1,500 to about 2,100 which comprises (1) polyols having a molecular weight of about 1,800 to about 2,200 selected from (a) about 65 to about 100 weight percent of a polyether polyol or (b) about 65 to about 95 weight percent of a polyol mixture comprising (i) about 35 to about 65 weight percent polyether polyol and (ii) about 65 to about 35 weight percent polyester polyol and correspondingly (2) about 35 to about 0 or 5 weight percent of at least one of a polyether polyol and polyester polyol having a molecular weight of about 800 to about 1,250, wherein said polyether polyol is selected from polytetramethylene ether glycol and polypropylene ether glycol, and said polyester polyol is selected from (i) caprolactone polyesters prepared from caprolactones containing six to eight carbon atoms and glycols containing four to seven carbon atoms and (ii) azelates of azelaic acid and glycols containing four to seven carbon atoms, where the ratio of isocyanato groups to the sum of hydroxyl groups of the polyols is about 1.7 to about 2.5, where the ratio of primary amino groups of the diamine to excess isocyanato groups over the sum of said hydroxyl groups is about 0.6 to about 1.1 and where the acid number of the polyols is less than about 1.

Thus a shock absorbing unit of this invention, suitable for use in a railroad draft gear, comprises a shock absorbing element, the said element comprising a solid disc-shaped resilient polyureaurethane composition of this invention having the said characteristic compression endurance and said deflection characteristics at about 25°C. and having two opposing and substantially parallel force-receiving surfaces connected by at least one sidewall, preferably a concave sidewall, and having rigid force-receiving plates, preferably metal plates, adhered to its force-receiving surfaces. Correspondingly, the shock absorbing device of a railroad draft gear comprises a series of such units, such as about 8 to about 12 and preferably 10, loaded in a cylinder in series to the shock load, with their force-receiving plates facing against each other.

The resilient polyureaurethane compositions of this invention can be further characterized by a −40°C. cold temperature compression test in addition to the deflection characterization test at about 25°C. According to this test, the said composition at about −40°C. when shaped and cured to a solid circular disc with a straight sidewall having a diameter of about 1.13 inch and a thickness of about 0.5 inch, requires a maximum pressure of 7,500, and preferably a maximum pressure of 6,000, pounds per square inch, applied to its flat surfaces to compress the disc 40 percent. This cold temperature compression test is a measure of stiffening of the polyureaurethane composition at low temperatures. It is a measure of the composition's ability to absorb energy without hardening and transmitting shock directly without absorption. A shock absorber of this invention has essentially bottomed out when its percent compression is substantially constant and its percent compression versus load curve substantially horizontal at high load values. The quality of high energy absorption without bottoming out is particularly required for railroad draft gears which are subject to large shocks over a relatively wide range of temperatures including temperatures down to about −40°C.

In the specification the term "total average molecular weight of about 900 to about 1,500" inches is used to describe the total resulting molecular weight equivalent of a mixture of the polyether polyols and the mixture of polyether polyols and polyester polyols. Thus, such a mixture having a total average molecular weight of 1,400 can consist of individual polyols having, for example, molecular weights of 1,000, 1,250 and 2,000. Also, for example, a polytetramethylene ether glycol with an average molecular weight of 1,500 mixed with a polyester polyol having a molecular weight of 1,000, can be the molecular weight equivalent of mixing the polyester polyol having its individual average molecular weight of 1,000 with two polytetramethylene ether glycols having individual average molecular weights of about 1,000 and about 2,000.

Preferably, the polyether polyol-polyester polyol mixture is selected from (a) polytetramethylene ether glycols having an average molecular weight of about 900 to about 1,100 or a mixture with molecular weights of about 900 to about 1,100 and of about 1,900 to about 2,100 and (b) at least one of the polyester polyols selected from hexane diol adipate and azelate having molecular weights of about 800 to about 1,200, tetramethylene azelate having a molecular weight of about 1,800 to about 2,200 and polyesters of ε-caprolactone and diethylene glycol having molecular weights of about 1,100 to about 1,400 and about 1,800 to about 2,200.

It is a critical feature of this invention that the ratio of isocyanato groups of the diisocyanate to the sum of the hydroxyl groups of the polyether polyol (polytetramethylene ether glycol) and polyester polyol is from about 1.7 to about 2.5 and preferably from about 1.8 to about 2.2.

It is preferred that a sufficient amount of diamine is used to provide a ratio of primary amino groups to excess isocyanato groups of the diisocyanate over the sum of the hydroxyl groups of the polyether polyols and polyester polyols (reactive hydrogen-containing materials) in the range of about 0.6 to about 1 and preferably from about 0.7 to about 0.95. Thus, for example, it is desired that from about 0.4 to about 1.1 moles of the diamine is added to the reaction product of the mixtures comprising correspondingly from about 1.7 to about 2.5 moles, preferably from about 1.8 to about 2.0 moles, of the diisocyanate and about 1 mole of the polyether polyol or mixture of polyether polyol and polyester polyol.

It is a further required feature of the invention that the polytetramethylene ether glycols, the caprolactone polyesters, the adipates, the azelates and their mixture have an acid number of less than about 1, desirably less than about 0.5 and more preferably less than about 0.1.

The polytetramethylene ether glycol is of the structure and composition typically prepared from tetrahydrofuran with the aid of an alkylene oxide initiator having two to four carbon atoms, such as ethylene oxide.

The caprolactone polyesters are substantially linear, hydroxyl-terminated polymers prepared by reacting a caprolactone having six to about eight carbon atoms in the ring, preferably six carbon atoms, with a glycol having four to seven carbon atoms and preferably four to six carbons. Various suitable caprolactones include ε-caprolactone, zeta-caprolactone and eta-caprolactone. Alkyl substituted caprolactones can be used with alkyl substituents containing one to two carbon atoms selected from methyl and ethyl radicals, such as methyl ε-caprolactone. Desirably, the caprolactone polyester has a molecular weight in the range of about 800 to about 2,200, preferably about 1,200 to about 2,100, with corresponding hydroxyl numbers in the range of about 140 to about 45 and about 95 to about 55, respectively.

The adipates and azelates preferably have a molecular weight in the range of about 800 to about 2,200 with a corresponding hydroxyl number in the range of about 140 to about 50.

Various suitable glycols for the preparation of the polyester polyols include straight chain aliphatic hydrocarbon diols, preferably hydroxyl-terminated diols, and alkylene ether glycols, preferably hydroxyl-terminated, for preparing the caprolactone polyesters, the adipates and the azelates. Representative of the straight chain aliphatic hydrocarbon hydroxyl-terminated diols are 1,4-butane diol, 1,5-pentane diol, 1,6-hexane diol, 1,7-heptane diol. Representative of the alkylene ether glycols is diethylene glycol. The hydrocarbon diols are generally desired for the adipates and azelates with the 1,4-butane diol and 1,6-hexane diol being preferred. The caprolactone polyester of ε-caprolactone and diethylene glycol and polyesters selected from tetramethylene adipate, 1,6-hexane diol adipate, tetramethylene azelate and 1,6-hexane diol azelate are particularly desirable. The tetramethylene adipates and azelates are, of course, prepared from 1,4-butane diol and appropriate acid.

The polyesters are typically formed at a temperature of from about 50°C. to about 300°C. and preferably in the range of about 120°C. and 200°C. A catalyst can be used to increase the reaction rate, if desired. For a more detailed description of preparation of various suitable caprolactone polyesters, reference is made to U.S. Pat. No. 2,933,478.

In the practice of this invention the preferred diamine curative for preparing a polyureaurethane draft gear unit for compression cycle test endurance as well as large shock load absorbing ability is 2,2'-diaminodiphenyl-disulfide and the preferred diisocyanate is selected from 3,3'-dimethyldiphenylenemethane-4,4'-diisocyanate and 3,3'-bitolylene-4,4'- diisocyanate with 3,3'-dimethyldiphenylenemethane-4,4'-diisocyanate being the most preferred.

The resilient polyureaurethane composition can be prepared by first reacting the polyether polyol or polyether polyol and polyester polyol with the diisocyanate under substantially anhydrous conditions at a temperature of from about 100°C. to about 140°C. for about 30 to about 60 minutes. This reaction can be conducted at atmospheric or above or below atmospheric pressure. A catalyst can be added to the diisocyanate-polymeric polyol or polyol and polyester reaction mixture to reduce its reaction time. When such a catalyst is used, it is usually added to the reaction mixture before the addition of the diisocyanate or with the addition of the diisocyanate. Various catalysts can be used exemplary of which are the amine catalysts, such as triethyl amine, n-methyl morphline and n-ethyl morphline.

The diamine curative is then added to and mixed with the polymeric product of this reaction, sometimes called a prepolymer, under essentially anhydrous conditions. The resulting polyureaurethane reaction mixture is then cast in a suitable mold and cured to form the shaped resilient polyureaurethane composition of this invention. The said reaction mixture can be cured at about 20°C. to about 50°C., although faster cures can be obtained at higher temperatures, for example, about 50°C. to about 200°C. Normally the reaction mixture is allowed to cure at 125°C. from 16 to about 24 hours.

When the shaped resilient polyureaurethane composition is prepared by pouring the polyureaurethane reaction mixture into a mold having the desired configuration and then curing the polyureaurethane reaction mixture, metal plates suitable for use as force-receiving plates for the shock absorbing device of this invention can be placed in the mold before curing the polyureaurethane reaction mixture. If desired, a suitable bonding cement such as a phenolic or polyester-polyisocyanate adhesive may be applied to the metal plates. Exemplary are the cements taught to be useful in U.S. Pat. No. 2,992,939 and Australian Pat. No. 256,373. By curing the polyureaurethane reaction mixture in the presence of the said metal plates, a metal plate is adhered to at least one of the force-receiving surfaces of the polyureaurethane member to form a laminate of the structure shown in FIGS. 1 and 2, for instance. Suitable metal plates generally conform to the planar dimensions of the force-receiving surfaces of the shock absorbing units and have a thickness in the range of from about 1/16 to about 1/2 inch, preferably from about 1/8 to about 1/4 inch, or from about 100 to about 200 mils. It is preferable to use steel plates for the force-receiving surfaces such as hot-rolled mild steel having a carbon content in the range of from about a 10/15 to about a 10/30 Society of Automotive Engineers' (SAE) classification.

For further understanding of the invention, reference may be had to the accompanying drawing in which.

Figure 1:
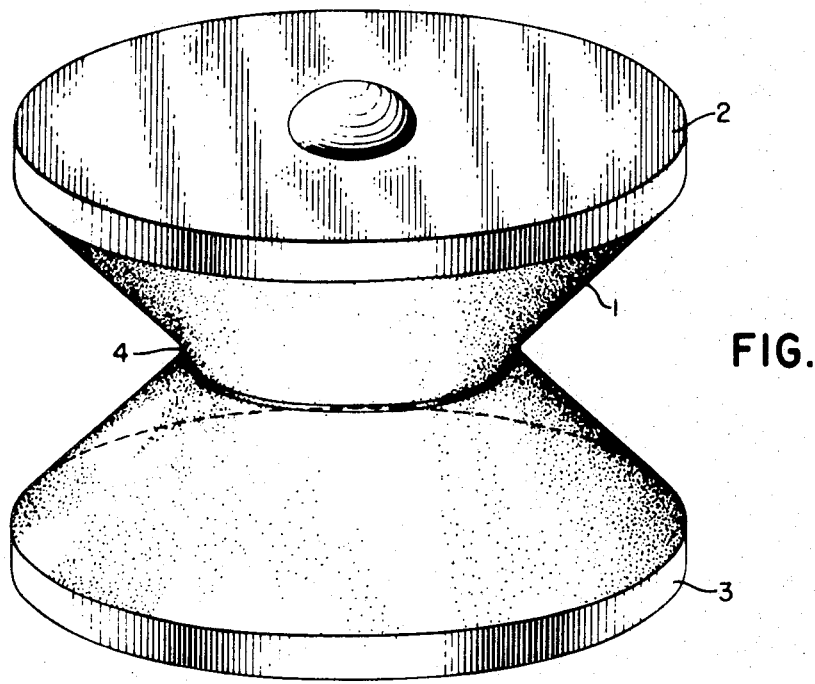
FIG. 1 is a perspective view illustrating one form of the shock absorbing device.
Figure 2:
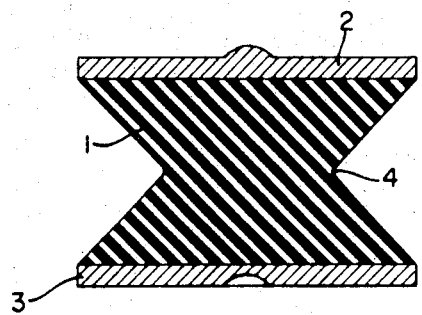
FIG. 2 is a vertical longitudinal sectional view further illustrating the shock absorbing device.
Figure 3:
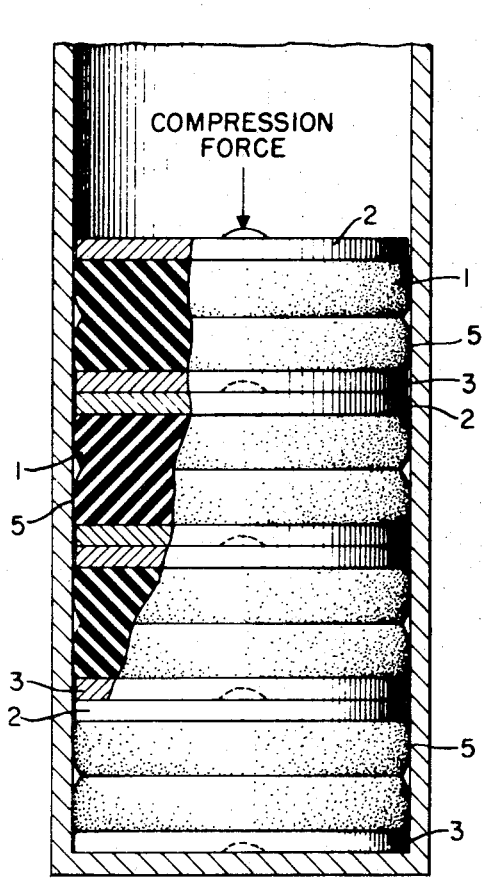
FIG. 3 is a vertical longitudinal sectional view of shock absorbing devices of the type shown in FIG. 1 and FIG. 2 placed in a supporting cylinder and disposed transversely to a compression force wherein the said shock absorbing devices are compressed to about 40 percent of their original height.

Referring to the drawing, the shock absorbing devices or units shown in FIG. 1 and FIG. 2 comprise the improved resilient cured polyureaurethane member (1) bonded or laminated to two opposite and substantially parallel force-receiving hot-rolled mild steel plates (2 and 3). A portion of the sidewall of the resilient polyureaurethane member is concave in the form of a V-shaped groove (4). The ratio of the volume displaced by the groove to the volumes of the polyureaurethane member plus that displaced by the groove times 100 is about equal to the percent compression anticipated. A suitable railroad draft gear can be formed as illustrated in FIG. 3 under a suitable compression load where the resilient cured polyureaurethane members are deformed and their sidewalls forced laterally outward (5).

The practice of this invention is further illustrated by reference to the following example which is intended to be representative rather than restrictive of the scope of the invention. Unless otherwise indicated, all parts and percentages are by weight.

EXAMPLE I

Experiments A-F were conducted by first charging to reactors A-F respectively, under essentially anhydrous conditions, various amounts of polyether and polyester polyols consisting of polytetramethylene ether glycols having molecular weights of about 1,000 and of about 2,000, tetramethylene azelate having a molecular weight of about 2,000 and polyester of ε-caprolactone and diethylene glycol having a molecular weight of about 2,000. The polyester polyols had acid numbers of less than about 0.5. The mixtures of polyols were stirred (as a precautionary measure to remove any potential moisture) under reduced pressure at about 110°C. for about an hour. To the polyol mixtures were then added various amounts of 3,3'-bitolylene-4,4'-diisocyanate (TODI) or 3,3'-dimethyldiphenylmethane-4,4'-diisocyanate (DMMDI) and the mixture stirred and allowed to react under reduced pressure at about 120°C. for about 45 minutes. To the mixture was then added various amounts of 2,2'-diaminodiphenyldisulfide [bis(2-AMP)DIS], 4,4'-methylene-bis-(2-chloroaniline) and/or o-dichlorobenzidine. The following Table 1 illustrates the mixture make-up.

TABLE 1

| | A | B | C | D | E | F |
|---|---|---|---|---|---|---|
| Polytetramethylene ether glycol (1000) | 18 | 17.5 | — | 20 | 7 | 20 |
| Polytetramethylene ether glycol (2000) | 42 | 41.2 | 100 | 80 | 53 | 40 |
| ε-caprolactone polyester (2000) | — | 41.2 | — | — | 40 | 40 |
| Tetramethylene azelate (2000) | 40 | — | — | — | — | — |
| DMMDI | 32.9 | — | — | 31.0 | 29.6 | 31.5 |
| TODI | — | 30.2 | 27.2 | — | — | — |
| MOCA | — | — | — | 12.4 | 13.3 | 4.18 |
| ODCB | — | — | — | — | — | 8.26 |
| Bis(2-AMP)DIS | 13.2 | 11.4 | 11.0 | — | — | — |

The reaction mixtures were then immediately poured or cast into molds in which had been inserted two circular hot-rolled mild steel metal plates having an SAE classification of about 10/20 and having diameters of about 6.5 inches and thicknesses of 135 mils. The plates had been coated with a polyester-polyisocyanate type of adhesive to enhance their adhesion to the cast polyureaurethane. The mixtures were cured in the molds at about 115°C. for about 22 hours to provide polyureaurethane steel laminates as shock absorbing units similar to that shown in FIGS. 1–3 in the drawing of this specification, the shaped resilient polyureaurethane compositions having diameters of 6.5 inches and thicknesses of 1.5 inches. Their sidewalls were in the shape of a V-shaped groove having a volume equal to about 2/3 of the polyureaurethane.

The shock absorbing units deflected (compressed) about 0.44 to about 0.55 inch at about 25°C. upon the application of about 1,800 pounds per square inch uniformly to the surface areas of steel force-receiving plates. Actually, the test was conducted by placing two of such units in series under test, and their total deflection was about 0.88 to about 1.1 inch.

Shock absorbers having polyureaurethane members prepared according to this invention but having too low a mole ratio of diisocyanate to polymeric polyester typically deflect more than about 0.6 inch when subjected to this test. Such shock absorbing units when used in a railroad car draft gear typically absorb insufficient amounts of energy and, thus, are usually fully compressed before sufficient compressive force energy is absorbed by the gear during usage. Such shock absorbers having a polyureaurethane member having too high a ratio of diisocyanate to polymeric polyester typically deflect less than about 0.30 inch when subjected to this test. When used in a railroad draft gear, they typically absorb an insufficient amount of energy before transmitting the energy, or force resulting from coupling the railroad car, through the draft gear and also break down during usage.

Portions of each of the polyureaurethane reaction mixtures were cured and shaped to form discs having diameters of about 1.13 inch and thicknesses of about 0.5 inch. At about −40°C. a pressure applied to their flat surfaces of about 5,800 to about 7,300 pounds per square inch was required to compress the individual discs about 40 percent of their original thicknesses. At 24°C. such a compression required from about 2,000 to about 2,500 pounds per square inch with a maximum of about 2,700 being desired.

Thus, the shock absorbing units had desirable load deflections or compressions for use in railroad draft gears for a wide range of temperatures such as from about −20°C. to about 25°C. and preferably up to about 50°C.

The shock absorbing units are further desirably characterized by a −35°C. hammer drop test and by an AAR endurance test.

A hammer drop test is described by first vertically loading a draft gear cylinder with 10 of the shock absorber units or pads similar to FIGS. 1–3 in series to a shock load with their adherent metal force-receiving plates facing each other to form a draft gear. A 27,000 pound hammer is dropped onto the end of the vertically positioned gear from several heights. The impact shock is measured, typically expressed as the height the hammer is dropped in inches, and the capacity of the gear is determined. The capacity of the gear is measured at the point where the gear "bottoms out," i.e., when it starts to transmit shock directly from the hammer drop rather than cushion and absorb the shock force. Thus, the gear can typically "bottom out" with a 27,000 pound hammer being dropped from a height of about 18 inches for a 40,000 foot pound shock force. The draft gear is then cooled to −35°C. and drop hammered three times with the 27,000 pound hammer for the −35°F. hammer drop test. The capacity is measured and the gear disassembled followed by examining the pads. A criteria for failing the hammer drop test is deterioration of the pads such as cracking, particularly at −35°C., or by bottoming out at a shock load less than about 40,000 foot pounds at about 25°C.

The AAR Endurance Test (American Association of Railroads) can be referred to as AAR Spec. M-901-E Endurance Test. The test is generally similar to the −35°C. hammer drop test but starting at room temperature or about 25°C. A 27,000 pound hammer is dropped at variable vertical heights of from about 1 to about 30 inches over a period of time until 35 million foot pounds of energy have been expended upon the gear which typically comprises 10 of the shock absorbing units or pads. The capacity of the gear is measured both at the beginning and at the end of the test as well as periodically during the test. The gear capacities before, during and after the test are then compared to determine any changes in capacity which the gear may undergo. The gear is then disassembled and inspected for deterioration of the pads. Appreciable loss of capacity or deterioration of the pads, such as by excessive cracking, are criteria for failing the endurance test. It is preferred that the gear, when composed of 10 of the pads, has a capacity of at least about 40,000 foot pounds before bottoming out, or a capacity of about 4,000 foot pounds per pad at about 25°C. In this test, the 27,000 pound hammer shocks are applied gradually over a period of time to prevent excessive heat build-up because the gear heats up considerably after each hammer drop.

Shock absorbing units prepared from experiments B-F successfully passed the compressive cycling test for at least about 500 cycles where a unit was alternately compressed under constant compression alternating between about 8 to about 12 percent down to about 45 to about 55 percent of its original polyureaurethane height. More specifically, a unit is compressed from about 8 to about 12 percent down to said 45 to 55 percent and allowed to return to its 8 to 10 percent compression. This may take about 30 seconds. About 4½ minutes later the cycle is repeated. Thus, a cycle takes about 5 minutes. Typically a larger force is required to compress the unit during its first cycle with such force diminishing somewhat for the next 10 to 50 cycles. Then the force tends to level out or stay somewhat constant until the unit begins to break down. At this point, the required force typically rather quickly reduces over a span of a relatively few cycles. Therefore, a typical measure of cycles which a unit suitable for a railroad draft gear can withstand or endure is the number of such 5 minute cycles it can withstand until the maximum compressive force necessary to compress it from a compression of about 8 to about 12 percent of its original polyureaurethane uncompressed height down to about 45 to about 55 percent of such height has reduced or dropped about 25 percent of the force required for the first compression cycle.

The shock absorbing units of this invention and particularly as described in this example, have unique utility as railroad draft gear shock absorbing units. In practice, the shock absorbing device of a railroad draft gear is typically assembled by the series loading of 8 to 14, preferably 10, of the shock absorbing units of this invention and preferably of the prescribed 6.5 inch diameter shaped polyureaurethane disc having the 1.5 inch thickness and V-grooved sides, followed by placing the units in the device under about 20,000 pounds force for operational use in the railroad car.

In the practice of this invention, it is typically desired that the polyureaurethane contain an antioxidant amount of an antioxidant. Thus, it may be typically desired that the polyureaurethane contained in the range of about 0.5 to about 3 and more preferably about 1 to about 2 weight percent of an antioxidant such as an amine or a hindered phenolic type. Usually an amine antioxidant is satisfactory. Usually the antioxidant is mixed with a diol diisocyanate mixture or product or more preferably is simply mixed with the polyol. The addition of the antioxidant is primarily to enhance the maintenance of the shock absorber's desired properties over a long period of time.

While certain representative embodiments and details have been shown for the purpose of illustrating the invention, it will be apparent to those skilled in this art that various changes and modifications may be made therein without departing from the spirit or scope of the invention.

What is claimed is:

1. A shock absorbing unit which comprises a shaped resilient polyureaurethane composition prepared by the method which comprises reacting at least one diamine selected from the group consisting of 2,2'-diaminodiphenyldisulfide, 4,4'-diaminodiphenyldisulfide, orthodichlorobenzidine and 4,4'-methylene-bis-orthochloroaniline with the reaction product of (A) at least one diisocyanate selected from 3,3'-bitolylene-4,4'-diisocyanate, when said diamine is selected from 2,2'-diaminodiphenyldisulfide and 4,4'-diaminodiphenyldisulfide and from 3,3'-dimethyldiphenylenemethane-4,4'-diisocyanate when said diamine is selected from orthodichlorobenzidine and 4,4'-methylene-bis-orthochloroanilene, with (B) a mixture of at least one polymeric polyol with a total average molecular weight of about 1,500 to about 2,100 which comprises (1) polyols having a molecular weight of about 1,800 to about 2,200 selected from (a) about 65 to about 100 weight percent of a polyether polyol or (b) about 65 to about 95 weight percent of a polyol mixture comprising (i) about 35 to about 65 weight percent polyether polyol and (ii) about 65 to about 35 weight percent polyester polyol and correspondingly (2) about 35 to about 0 or 5 weight percent of at least one of a polyether polyol and polyester polyol having a molecular weight of about 800 to about 1,250, wherein said polyether polyol is selected from polytetramethylene ether glycol and polypropylene ether glycol, and said polyester glycol is selected from (i) caprolactone polyesters prepared from caprolactones containing six to eight carbon atoms and glycols containing four to seven carbon atoms and (ii) azelates of azelaic acid and glycols containing four to seven carbon atoms, where the ratio of isocyanato groups to the sum of hydroxyl groups of the polyols is about 1.7 to about 2.5, where the ratio of primary amino groups of the diamine to excess isocyanato groups over the sum of said hydroxyl groups is about 0.6 to about 1.1 and where the acid number of the polyols is less than about 1.

2. The shock absorbing unit of claim 1 characterized by withstanding compressive cycling for at least about 300 cycles under constant compression, a cycle comprising alternating between a maximum of about 45 to about 55 percent and a minimum of about 8 to about 12 percent of its original uncompressed height over a period of about 30 seconds for a complete cycle followed by about 4.5 minute pause between cycles, and further characterized by deflecting from about 0.3 to about 0.6 inch at about 25°C. upon the application of about 1,800 pounds per square inch uniformly to the end surface areas (force-receiving surfaces) of the said shaped resilient composition when the said composition is a generally disc-shaped cylindrical element with circular parallel end surfaces, said surfaces covered and adhered to circular steel plates, having a diameter of about 6.5 inches, a height of about 1.5 inches and a sidewall connecting the end surfaces substantially in the form of a V-shaped groove having substantially equal length sides, the said groove extending between the said end surfaces, the volume of the solid portion of the said element being about 150 percent of the volume of the said groove.

3. The shock absorbing unit of claim 2, where said polyureaurethane is characterized by a −40°C. cold temperature compression test where the said polyureaurethane, at −40°C., when shaped and cured to a solid circular disc with a straight side-wall, having a diameter of about 1.13 inch and a thickness of about 0.5 inch, requires a maximum pressure of 7,500 pounds per square inch applied to its flat surfaces to compress the disc 40 percent.

4. The shock absorbing unit of claim 2 where said diamine is 2,2'-diaminodiphenyldisulfide, where said polyether polyol-polyester polyol mixture has a total average molecular weight in the range of about 1,400 to about 1,800 and the polyester polyols are selected from at least one of (a) caprolactone polyesters prepared from ε-caprolactone and diethylene glycol, (b) adipates of adipic acid and glycols selected from 1,4-butane diol and 1,6-hexane diol and (c) azelates of azelaic acid and glycols selected from 1,4-butane diol and 1,6-hexane diol, where the ratio of isocyanato groups of the diisocyanate to the sum of the said hydroxyl groups of the polyols is from about 1.7 to about 2.0, where the ratio of primary amino groups to excess isocyanato groups over the sum of the said hydroxyl groups of the polyols is from about 0.7 to about 0.95.

5. The shock absorbing unit of claim 4 where the polyether polyol is polytetramethylene ether glycol.

6. The shock absorbing unit of claim 4 where the diisocyanate is 3,3'-dimethyldiphenylenemethane-4,4'-diisocyanate.

7. The shock absorbing unit of claim 1 suitable for use in a railroad draft gear comprising said shaped solid resilient polyureaurethane composition having two opposing and substantially parallel force-receiving surfaces connected by at least one side-wall and having rigid force-receiving metal plates adhered to its force-receiving surfaces.

8. The shock absorbing unit of claim 7 having a generally disc-shaped cylindrical element with circular parallel end surfaces having diameters of about 6.5 inches, a height of about 1.5 inch, and a side-wall connecting the end surfaces substantially in the form of a V-shaped groove having substantially equal length sides, the said groove extending between the said end surfaces, the volume of the solid portion of the said element being about 150 percent of the volume of the said groove, and where the said adherent rigid force-receiving plates are steel plates.

9. The shock absorbing unit of claim 8 characterized by withstanding compressive cycling for at least about 500 cycles under constant compression, a cycle comprising alternating between a maximum of about 45 to about 55 percent and a minimum of about 8 to about 12 percent of its original uncompressed height over a period of about 30 seconds for a complete cycle followed by about 4.5 minute pause between cycles, and further characterized by deflecting from about 0.3 to about 0.6 inch at about 25°C. upon the application of about 1,800 pounds per square inch uniformly to the end surface areas (force-receiving surfaces) of the said shaped resilient composition when the said composition is a generally disc-shaped cylindrical element with circular parallel end surfaces, said surfaces covered and adhered to circular steel plates, having a diameter of about 6.5 inches, a height of about 1.5 inches and a sidewall connecting the end surfaces substantially in the form of a V-shaped groove having substantially equal length sides, the said groove extending between the said end surfaces, the volume of the solid portion of the said element being about 150 percent of the volume of the said groove.

10. The shock absorbing unit of claim 9 where said diamine is 2,2'-diaminodiphenyldisulfide, where said polyether polyol-polyester polyol mixture has a total average molecular weight in the range of about 1,400 to about 1,800 and the polyester polyols are selected from at least one of (a) caprolactone polyesters prepared from ε-caprolactone and diethylene glycol, (b) adipates of adipic acid and glycols selected from 1,4-butane diol and 1,6-hexane diol and (c) azelates of azelaic acid and glycols selected from 1,4-butane diol and 1,6-hexane diol, where the ratio of isocyanato groups of the diisocyante to the sum of the said hydroxyl groups of the polyols is from about 1.7 to about 2.0, where the ratio of primary amino groups to excess isocyanato groups over the sum of the said hydroxyl groups of the polyols is from about 0.7 to about 0.95.

11. A method of preparing the shock absorbing unit of claim 7 which comprises reacting the polyureaurethane reactants in a mold having the required configuration and having metal-force-receiving plates inserted therein.

12. A series of about 8 to about 12 of the shock absorbing units of claim 7 loaded in a cylinder in series to a shock load with their rigid force-receiving plates facing each other.

* * * * *

(C-7524)

PO-1050
(5/69)

UNITED STATES PATENT OFFICE
CERTIFICATE OF CORRECTION

Patent No. 3,823,833     Dated 7-16-74

Inventor(s) Daniel A Chung

It is certified that error appears in the above-identified patent and that said Letters Patent are hereby corrected as shown below:

Claim 1, line 37, after "4,4'-diisocyanate," insert

- and 3,3'-dimethyldiphenylmethane-4,4'-diisocyanate -.

Claim 1, lines 39 and 40, delete "3,3'-dimethyldiphenylene-methane-4,4'-diisocyanate" and insert therefore

- 3,3'-dimethyldiphenylmethane-4,4'-diisocyanate -.

Claim 1, lines 41 and 42, delete "4,4'-methylene-bis-orthochloroanilene" and insert therefore - 4,4'-methylene-bis-orthochloroaniline -.

Claim 6, lines 53 and 54, delete "3,3'-dimethyldiphenylene-methane-4,4'-diisocyanate" and insert therefore

- 3,3'-dimethyldiphenylmethane-4,4'-diisocyanate -.

Claim 10, line 12, delete "diisocyante" and insert therefore

- diisocyanate -.

Signed and sealed this 17th day of December 1974.

(SEAL)
Attest:

McCOY M. GIBSON JR.
Attesting Officer

C. MARSHALL DANN
Commissioner of Patents